United States Patent

Krummell, Jr. et al.

[11] Patent Number: 6,092,677
[45] Date of Patent: *Jul. 25, 2000

[54] WELDED BEDFRAME FOR A PUSH-BACK CART STORAGE SYSTEM

[75] Inventors: John V. R. Krummell, Jr., Long Beach; Richard Morel, Norwalk; Kenneth Davison, Palos Verdes Estates, all of Calif.

[73] Assignee: J.C.M. Industries, Inc., Huntington Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/923,011
[22] Filed: Sep. 3, 1997
[51] Int. Cl.⁷ .................................................. A47F 5/00
[52] U.S. Cl. ..................... 211/151; 211/59.2; 211/162; 414/276; 414/286
[58] Field of Search ................... 211/151, 59.2, 211/162; 414/276, 286

[56] References Cited

U.S. PATENT DOCUMENTS

| | | |
|---|---|---|
| 4,773,546 | 9/1988 | Konstant .............................. 211/162 X |
| 4,915,240 | 4/1990 | Konstant . |
| 4,982,851 | 1/1991 | Konstant .............................. 211/162 X |
| 5,180,069 | 1/1993 | Krummell et al. ..................... 211/151 |
| 5,312,004 | 5/1994 | Krummell et al. ..................... 211/151 |
| 5,328,038 | 7/1994 | Allen ..................................... 211/151 |
| 5,415,300 | 5/1995 | Krummell et al. ..................... 211/151 |
| 5,419,444 | 5/1995 | Strom ................................... 211/151 |
| 5,524,776 | 6/1996 | Hall et al. ............................. 211/151 |
| 5,598,934 | 2/1997 | Krummell et al. ..................... 211/151 |

*Primary Examiner*—Daniel P. Stodola
*Assistant Examiner*—Khoa Tran
*Attorney, Agent, or Firm*—Lyon & Lyon LLP

[57] ABSTRACT

A push-back storage system includes left and right rails welded to strut members, to provide a precise predetermined spacing between the rails. As the spacing between rails is permanently set during manufacture, no on site adjustment or alignment is needed. Carts can roll smoothly on the rails as the spacing between the rails is maintained. A U-bracket or a J-hook at the front of the bedframe facilitates attachment of the bedframe to a front load beam of a rack assembly. The strut members are welded to the rails.

4 Claims, 4 Drawing Sheets

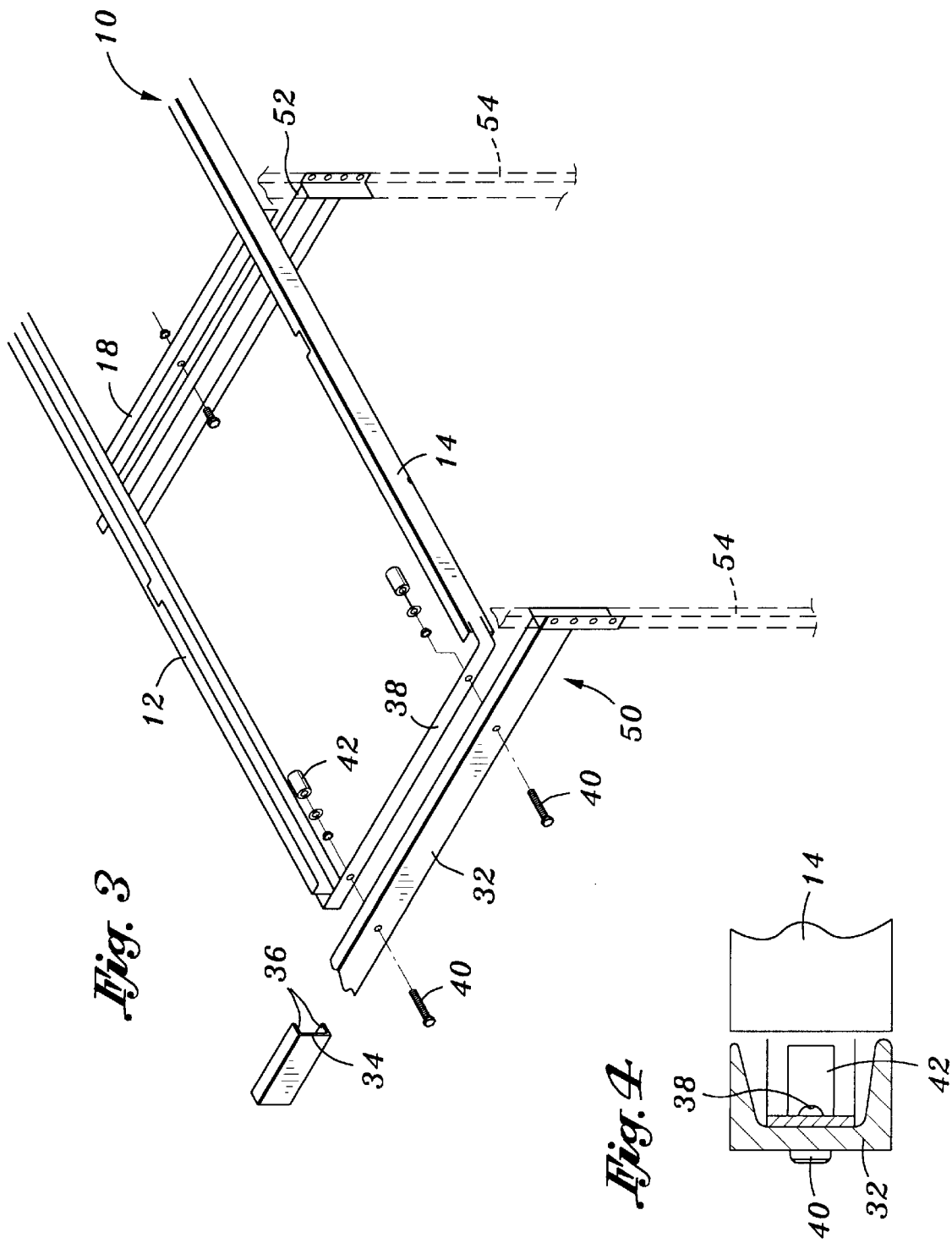

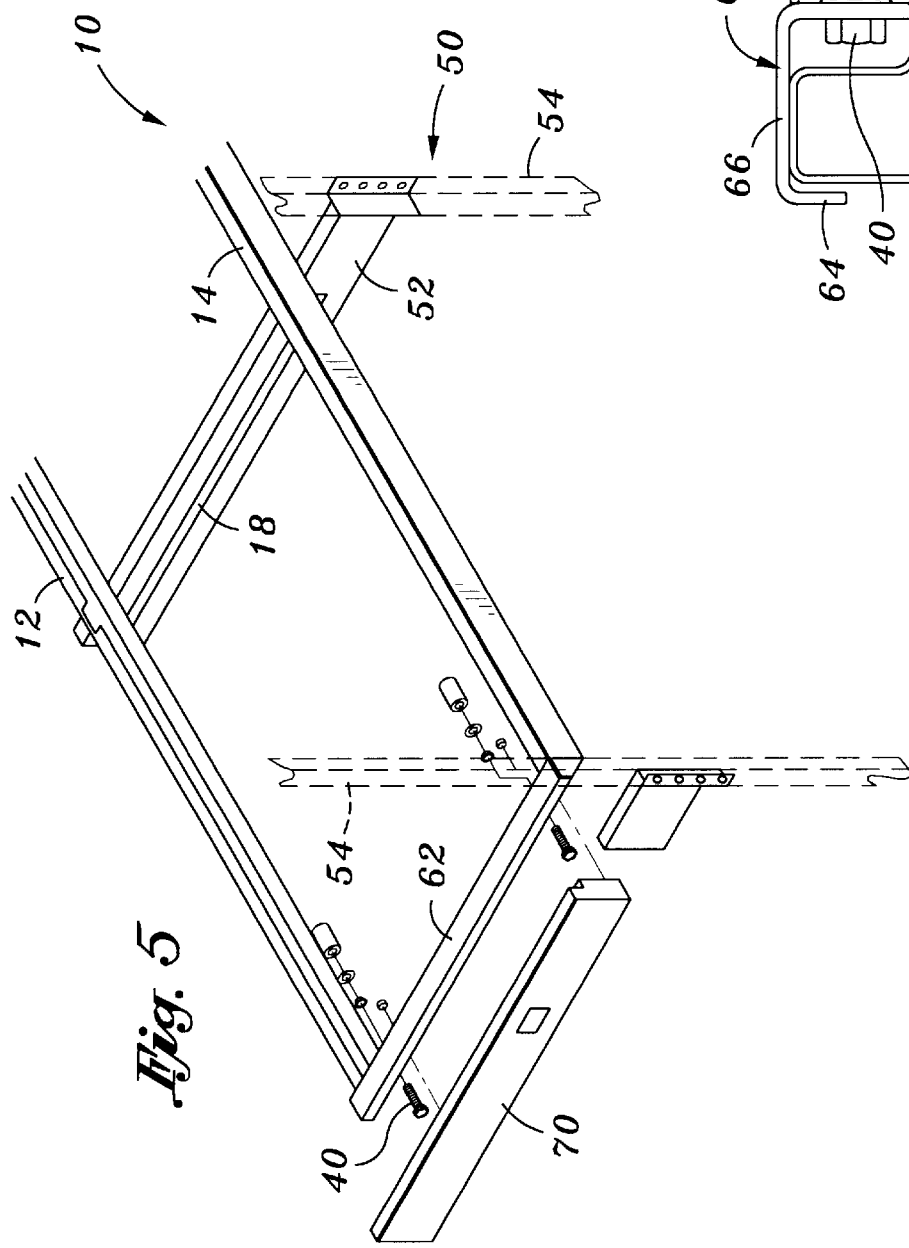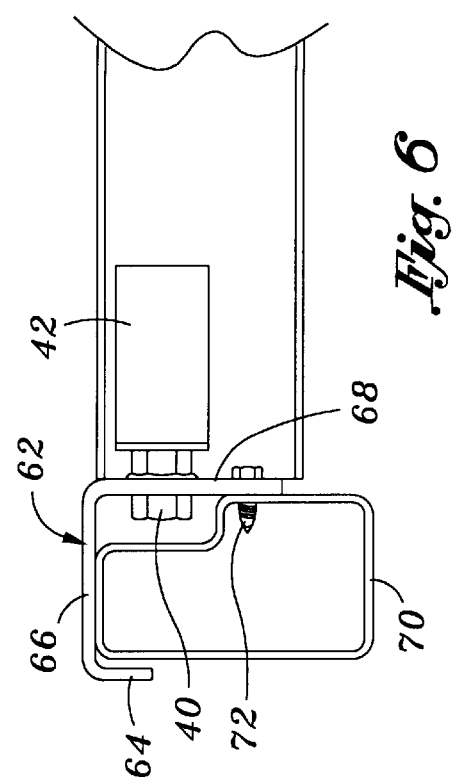

US 6,092,677

WELDED BEDFRAME FOR A PUSH-BACK CART STORAGE SYSTEM

BACKGROUND OF THE INVENTION

Push-back cart storage systems typically use rolling carts for carrying pallets or other cargo, on slightly inclined support rails. By staggering or telescoping several carts on support rails, useable space between aisles in e.g., a warehouse, is increased as multiple pallets can be stored and retrieved from a single aisle. This requires less space for aisles and allows more space to be used for storage.

Push-back cart storage systems are generally prefabricated at the factory and are then mounted on rack assemblies on site. The rack assemblies are secured to the floor of the building. Although prefabricated storage systems have substantially improved the speed, ease and cost of installation of storage space, a considerable amount of assembly time is still consumed for mounting the support rails on racks. As the support rails in the storage systems have been separately provided, assembling the storage system on a rack has required the support rails to be precisely aligned on-site, to assure that the spacing between the rails is correctly set to allow the carts to smoothly roll on the rails. This alignment process can be time-consuming, cumbersome and costly.

Therefore, there is a need for a push-back cart storage system that eliminates the need for aligning the support rails on-site, to further improve speed, cost and ease of installation. Accordingly, it is an object of the invention to provide an improved storage rack system. Other objects and advantages will appear hereinafter.

SUMMARY OF THE INVENTION

To these ends, a push-back cart storage system advantageously has a bedframe including a first rail and a second rail. A first strut member and a second strut member are preferably permanently attached to the first and second rails, e.g., by welding, to maintain a predetermined spacing between the rails. A U-bracket is advantageously attached to the first and second rails of the bedframe, and adapted to fit into a front load beam of a rack assembly.

In an alternative embodiment, a J-hook is attached to the front ends of the first to and second rails of the bedframe. The J-hook is advantageously adapted to hook onto a front load beam of a rack assembly.

Other objects and advantages will appear hereinafter.

BRIEF DESCRIPTION OF THE DRAWINGS

In the drawings, wherein similar reference characters denote similar elements throughout the several views:

FIG. 3 is an exploded perspective view of the bedframe of FIG. 1 including a front U-bracket;

FIG. 4 is a section view showing the U-bracket of FIG. 3 attached to a front load beam;

FIG. 5 is an exploded perspective of a second embodiment having a J-hook; and

FIG. 6 is a side section view of the J-hook shown in FIG. 5 installed onto a step ledge front load beam.

DETAILED DESCRIPTION OF THE PREFERRED EMBODIMENT

Figure 1:
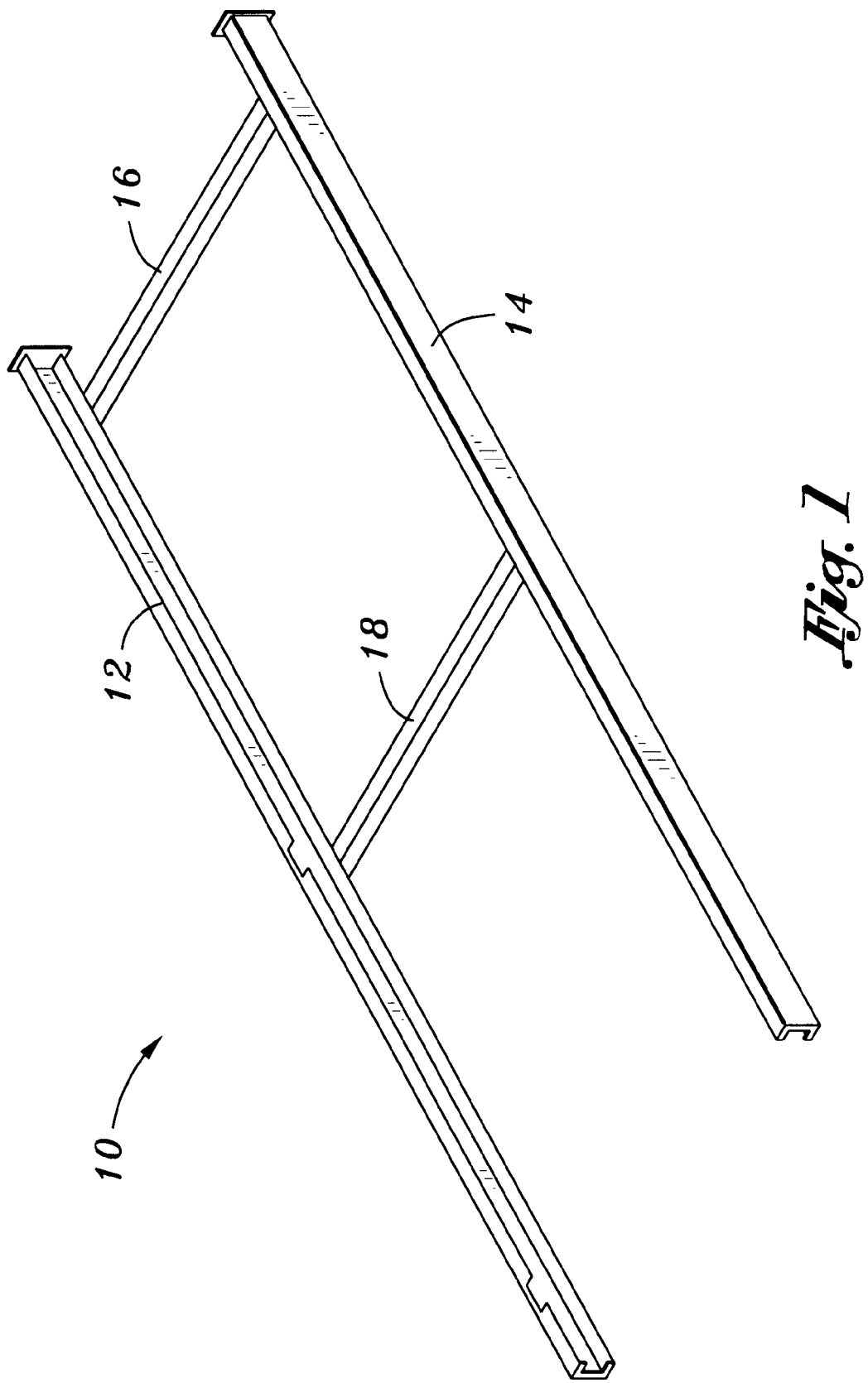
FIG. 1 is a perspective view of the present welded bedframe.

Turning now in detail to the drawings, as shown in FIG. 1, a welded bedframe 10 for a push-back cart storage system includes a left rail 12 and a right rail 14. A rear strut 16 and a center strut 18 are each permanently attached, preferably welded, to the rails 12 and 14. The struts 16 and 18 maintain a specified distance between the rails 12 and 14. Additional struts may also be used, depending on the length of the rails. The struts 16 and 18 may have various shapes but are preferably L-shaped.

Figure 2:
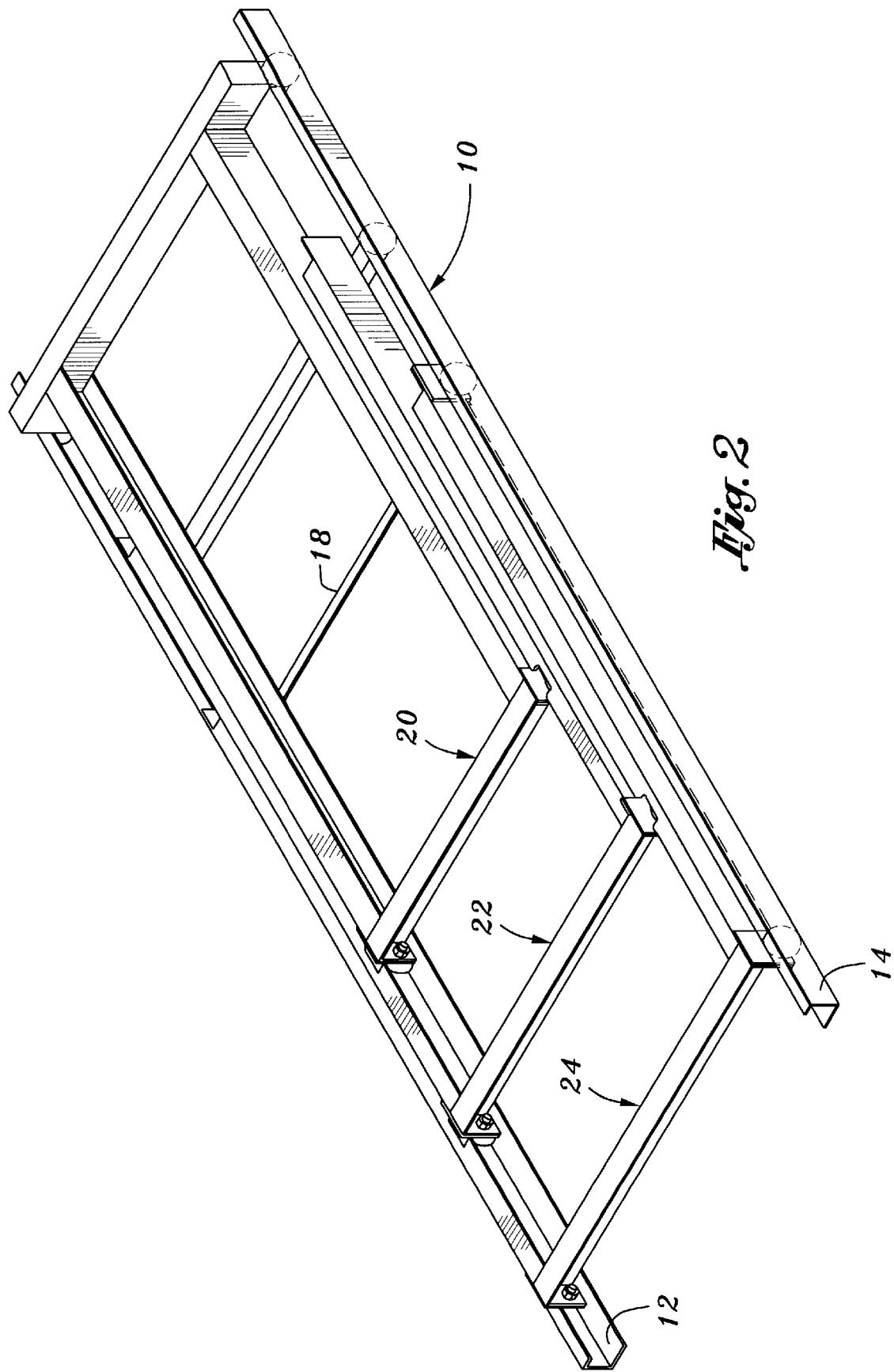
FIG. 2 is a perspective view of the welded bedframe of FIG. 1, with push-back carts installed on the bedframe.

As shown in FIG. 2, carts 20, 22 and 24 are installed in or on the bedframe 10 as described, for example, in U.S. Pat. Nos. 5,415,300 and 5,312,004, both incorporated herein by reference.

Turning to FIG. 3, a rack assembly 50 includes cross members 52 extending between vertical beams 54. The beams 54 are typically securely attached to the floor of the storage area and extend to a height sufficient to provide the number of levels of bedframes desired. A front load beam 32 extends across the front of the rack assembly. The front load beam 32 has a C or channel section shape, including arms 36 extending from a central web 34.

A U-bracket 38 is attached to the outside forward ends of the rails 12 and 14 of the bedframe 10. The U-bracket is advantageously welded to the bedframe. Referring to FIGS. 3 and 4, the U-bracket 38 is dimensioned to fit within the channel section of the front load beam 32. Fasteners 40 extend through the front load beam 32, and through the U-bracket 38, and support rubber bumpers 42. The bumpers 42 cushion the impact of the carts against the U-bracket 38, when the carts roll forward. Use of the U-bracket 38, as shown in FIGS. 3 and 4, provides a quick yet secure way of attaching the bedframe 10 to the front load beam 32.

Turning to FIGS. 5 and 6, in another embodiment, a J-hook 62 is welded to the front ends of the rails 12 and 14. The J-hook has a front lip 64, a top 66 and a back 68. The back 68 is welded at each end of the J-hook 62 to the front end of each rail 12 and 14. As shown in FIG. 6, the J-hook 62 is placed over the front load bar 70. The J-hook is preferably made as a single continuous member to reduce fabrication costs. A lag bolt 72 extends through the back 68 of the J-hook 62 into the load bar 70, to prevent the J-hook 62 from being lifted up off of the load bar 70.

The J-hook design shown in FIG. 5 and 6 also provides a quick yet reliable way to install the bedframe onto the rack assembly.

Thus, several embodiments have been shown and described. It will be apparent to those skilled in the art that many changes, modifications, and substitutions of equivalents may be made, without the parting from the spirit and scope of the invention. The invention, should not be restricted by the following claims and their equivalents.

What is claimed is:

1. A push-back cart storage system comprising:

a rack assembly having a front load beam with a channel section shape, including arms extending from a central web, with the front load beam supported on vertical upright beams;

a bedframe supported on the rack assembly and having a first rail and a second rail with each of the first and second rails having a front end, a first strut member and a second strut member permanently attached to the first and second rails, to maintain a predetermined spacing between the rails, the bedframe further including a U-bracket having ends and a center section, with the ends attached to the first rail adjacent to the front end of the first rail and attached to the second rail, adjacent to the front end of the second rail, and the center section of the U-bracket attached to the central web of the front load beam, between the arms of the front load beam of the rack assembly; and at least one cart having front wheels and a frame including front and rear cross members joined by side members, with the front wheels in rolling engagement with the first and second rails.

2. The storage system of claim 1, wherein the first and second strut members are welded to the support rails.

3. The storage system of claim 1, wherein the U-bracket is welded to the first and second rails.

4. The storage system of claim 1 further comprising a first cart and a second cart movably supported only by the first and second rails.

* * * * *